United States Patent Office 3,732,342
Patented May 8, 1973

3,732,342
BROMINATED PHOSPHATES
Carl L. Gibbons and Charles E. Reineke, Midland, Mich., assignors to The Dow Chemical Company, Midland, Mich.
No Drawing. Filed Nov. 2, 1970, Ser. No. 86,339
Int. Cl. C07f 9/08
U.S. Cl. 260—950                    3 Claims

ABSTRACT OF THE DISCLOSURE

Compounds useful as fire retardant plasticizers for polyvinyl chloride and as fire retardants for latex having the formula

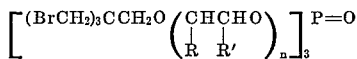

wherein R and R' are independently for each of the $n$ units H or methyl provided that both R and R' are not methyl in any one unit, and
$n$ is an integer of 1–10 have been discovered.

BACKGROUND OF THE INVENTION

There has been considerable interest in flame retardant materials. In large part, this interest has evolved from a greater concern for safety and the realization that there is the potential technical capacity to make materials fire retardant which have heretofore been flammable. This concern has resulted in both present and potential legislation requiring that commercial products meet certain flammability standards. As a result of this concern and legislation, considerable research effort has been directed toward making commercial products fire retardant.

An integral part of this research effort has been directed toward the discovery of new compounds that will impart the necessary fire retardancy to the substrate and at the same time leave the desirable properties of the substrate essentially the same. The compounds of the invention are results of such a search.

Compounds similar to those of the present invention are known but differ substantially in structure. The closest work to the present invention appears to be that of Carpenter et al. in U.S. 3,324,205 where tris[2,2,2-tris(bromomethyl)ethyl]phosphate is disclosed.

SUMMARY OF THE INVENTION

New compounds of the formula

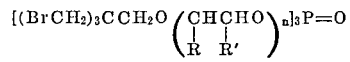

wherein R and R' are independently for each of the $n$ units H or methyl provided that both R and R' are not methyl in any one unit, and
$n$ is an integer of 1–10 have been discovered.

These compounds are useful as fire retardant plasticizers for polyvinyl chloride and as a fire retardant for latex resin.

The new compounds may be any of those delineated by the general formula. Of special interest in the invention are those wherein $n$ is an integer of 1 to 5 because of the higher percentage of bromine and phosphorus in the compound. Also preferred are those wherein R and R' are H because of their demonstrated ability as fire retardants.

These compounds are conveniently prepared by a two-step reaction, both steps of which are generically known. In the first step, tribromoneopentyl alcohol is reacted with ethylene oxide, propylene oxide or mixture thereof in suitable proportion so that the alcohol contains $n$ oxyalkylene units in the appropriate arrangement. In the second step, the product of the first step is reacted with phosphorus oxychloride to give the desired phosphate. The conditions and detail of these reactions are given in the specific embodiments.

As noted above, the compounds of the invention have two major known uses: (1) they are fire retardant plasticizers for polyvinyl chloride; and (2) they are fire retardants for latex resin.

The application of these compounds as plasticizers is important because many of commercial plasticizers make the substrate flammable. For example, polyvinyl chloride is flame retardant in and of itself, but polyvinyl chloride plasticized with materials common in the art can be quite flammable. The compounds of the invention may be used alone or in partial substitution for these known plasticizers to give a product which is both flexible and fire retardant.

The second major use of these compounds is as a fire retardant for latex resin. These latex resins are derived from latexes, such as styrene-butadiene latexes, acrylic latexes, vinyl ester latexes and vinyl ether latexes. The fire retardants are conveniently incorporated into the latex by physical mixing in an aqueous emulsion.

The amount of the new compounds of the invention added to the various substrates may vary widely depending upon the purpose of the particular application. Usually additive amounts of about 0.1 to about 10% or more by weight, however, give significant fire resistance and/or plasticization.

SPECIFIC EMBODIMENTS

EXAMPLE 1

Preparation of the compound where $n=2.5$ and R and R'=H

Six moles of tribromoneopentyl alcohol were placed in a reactor in a nitrogen atmosphere, and heated to 120° C. To the reactor was added 12 ml. of SnCl$_4$ and then 15 moles of ethylene oxide were sparged into the liquid reactor mass. The reaction temperature was maintained at 125° to 140° C. and upon completion of the reaction, 2600 g. of a pale yellow liquid was obtained. This product was determined to be the adduct of tribromoneopentyl alcohol having an average of 2.5 oxyethylene units per molecule. Two moles of this adduct were dissolved in 1 liter of benzene, placed in a reactor and cooled to 0° C. To this solution was added 2 moles of pyridine followed by ⅔ mole of phosphorus oxychloride added dropwise with stirring. After the addition, the reaction was stirred at 0° C. for 2 hours and at room temperature for 16 hours. The pyridine hydrochloride was removed by filtration, and the remaining benzene solution was washed with water, dried over magnesium sulfate, filtered and stripped of solvent to yield 636 g. of a yellow liquid which was identified by infrared spectroscopy and nuclear magnetic resonance spectroscopy to be

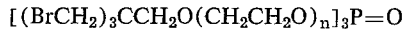
[(BrCH$_2$)$_3$CCH$_2$O(CH$_2$CH$_2$O)$_n$]$_3$P=O where $n$ had an average value of 2.5.

EXAMPLE 2

Preparation of the compound where $n=3$ and R and R'=H

In the same manner as shown in Example 1, the compound of the invention where $n$ had an average value of 3 and R=H was prepared by reacting tribromoneopentyl alcohol with ethylene oxide in a mole ratio of 3.2 moles of ethylene oxide per mole of alcohol. This product was then reacted with phosphorus oxychloride to obtain the phosphate of the formula

[(CH$_2$Br)$_3$CCH$_2$O(CH$_2$CH$_2$O)$_n$]$_3$P=O wherein the $n$ had an average value of 3.

EXAMPLE 3

Use as a plasticizer

On a Brabender mixer at 150° C. and 60 r.p.m., 20 g. of polyvinyl chloride, 6.0 ml. of dioctyl phthalate and 9.2 ml. of the mixture of Example 2 were blended for about 4 minutes. The blended material was then molded into a 3 mm. thick sheet at 150° C. and 10,000 p.s.i. for 4 minutes. The molding was transparent and was about as flexible as material prepared in the same manner by mixing 20 g. of polyvinyl chloride with 12 ml. of dioctyl phthalate. The molding containing the compound of the invention was self-extinguishing and had an L.O.I. as described by Combustion and Flame 10, 135 (1966) of 0.265. The polyvinyl chloride plasticized with dioctyl phthalate alone was flammable and had an L.O.I. of 0.225.

EXAMPLE 4

Use as a fire retardant for latex

The mixture of compounds of the invention prepared in Example 1 was solubilized in a styrene-butadiene latex sold under the trade name Dow Latex 880. This was done by adding to a 10 oz. citrate bottle, 10 g. of deionized water, 10 g. of the product of Example 1 and 208 g. of 48 wt. percent aqueous latex and rotating the bottle end over end for 20 hours at 70° C. After mixing, the sample was examined by neutron activation analysis and the phosphate was found to be completely solubilized in the latex polymer. Films cast from this latex were fire resistant. For comparison, a parallel test was run with tris[2,2,2-tris(bromomethyl)ethyl] phosphate shown by U.S. 3,324,205 instead of a compound of the invention. This prior art phosphate was not solubilized into the latex.

In the same manner as described by Examples 1 and 2, other phosphates of the general formula may be prepared. For example,

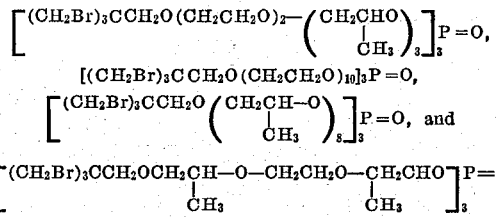

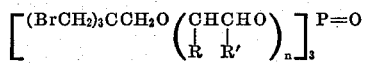

$$\left[(CH_2Br)_3CCH_2O\left(\begin{matrix}CH_2CH-O\\ |\\ CH_3\end{matrix}\right)_8\right]_3 P=O, \text{ and}$$

$$\left[(CH_2Br)_3CCH_2OCH_2CH-O-CH_2CH_2O-CH_2CHO\atop \phantom{xxxxxxxxx}CH_3\phantom{xxxxxxxxxxx}CH_3\right]_3 P=O$$

are prepared by analogous reactions. These compounds may then be added to polyvinyl chloride or styrene-butadiene latex as fire retardants and/or plasticizers.

I claim:

1. A compound of the formula $$\left[(BrCH_2)_3CCH_2O\left(\begin{matrix}CHCHO\\ |\phantom{x}|\\ R\phantom{x}R'\end{matrix}\right)_n\right]_3 P=O$$

wherein

R and R' are independently for each of the $n$ units H or methyl provided that both R and R' are not methyl in any one unit, and $n$ is an integer of 1–10.

2. The compound of claim 1 wherein $n$ is an integer of 1–5.

3. The compound of claim 1 wherein R and R' are hydrogen.

References Cited

UNITED STATES PATENTS 2,325,979    8/1943    Garbach _____ 260—950 X
2,727,058   12/1955    Conly _____ 260—950

LEWIS GOTTS, Primary Examiner

R. L. RAYMOND, Assistant Examiner

U.S. Cl. X.R.

260—29.6 MP, 30.6 R, 974